United States Patent [19]

le Pape

[11] 4,080,355
[45] Mar. 21, 1978

[54] QUINACRIDONES AND SYNTHETIC FIBERS DYED THEREWITH

[75] Inventor: Alain Yves le Pape, Rouen, France

[73] Assignee: Produits Chimiques Ugine Kuhlmann, Paris, France

[21] Appl. No.: 730,928

[22] Filed: Oct. 8, 1976

[30] Foreign Application Priority Data

Oct. 23, 1975 France .................................. 75 32445

[51] Int. Cl.² ............................................. C09B 48/00
[52] U.S. Cl. ............................ 260/40 P; 260/37 NP; 260/279 QA
[58] Field of Search ......... 260/279 QA, 40 P, 37 NP; 106/288 Q

[56] References Cited

U.S. PATENT DOCUMENTS

| | | | |
|---|---|---|---|
| 3,279,974 | 10/1966 | Twilley et al. | 260/40 PX |
| 3,336,312 | 8/1967 | Braun et al. | 260/279 R |
| 3,579,519 | 5/1971 | Schweizer | 260/279 R |
| 3,752,817 | 8/1973 | Ehrich et al. | 260/279 R |

*Primary Examiner*—Donald G. Daus
*Assistant Examiner*—Diana G. Rivers
*Attorney, Agent, or Firm*—Beveridge, DeGrandi, Kline & Lunsford

[57] ABSTRACT

Quinacridone compounds are disclosed which may be represented by the general formula:

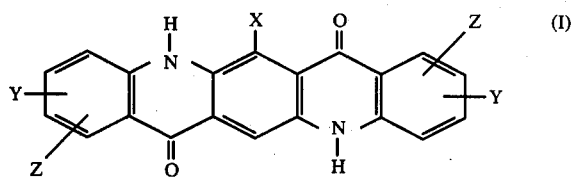

wherein
- X represents hydrogen or hydroxy;
- Y represents hydroxyalkoxy containing 1 to 4 carbon atoms, preferably 1 to 2 carbon atoms or carboxylic ester COOR;
- R represents alkyl which preferably contains 1 to 4 carbon atoms; and
- Z represents hydrogen or halogen, preferably chlorine or bromine, or alkyl or alkoxy containing 1 to 4 carbon atoms, preferably 1 to 2 carbon atoms.

These quinacridones can be used for the dyeing of synthetic fibers such as polyesters and polyamides and for the synthesis of structurally dyed copolyesters.

13 Claims, No Drawings

QUINACRIDONES AND SYNTHETIC FIBERS DYED THEREWITH

The present invention relates to new quinacridone compounds and the dyeing of textile fibers, especially synthetic fibers and filaments, with these new compounds.

The novel compounds of the invention may be represented by the general formula:

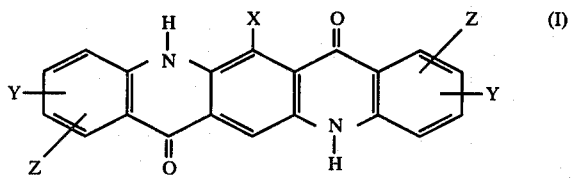

wherein:
- X represents hydrogen or hydroxy;
- Y represents hydroxyalkoxy containing 1 to 4 carbon atoms, preferably 1 to 2 carbon atoms, or carboxylic ester COOR;
- R represents alkyl which preferably contains 1 to 4 carbon atoms; and
- Z represents hydrogen or halogen, preferably chlorine or bromine, or alkyl or alkoxy containing 1 to 4 carbon atoms, preferably 1 to 2 carbon atoms. Examples of alkyl and alkoxy groups are methyl, methoxy, ethyl, ethoxy.

These new quinacridones can be prepared according to known methods. For example, the quinacridone compound of formula (I), wherein X is hydrogen and Y is hydroxyalkoxy may be prepared by condensing 2,5-dicarbomethoxy (or dicarbethoxy) cyclohexane-1,4-diketone with an amine having the formula:

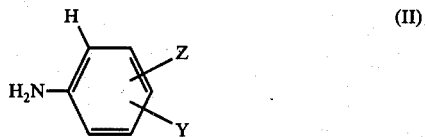

followed by oxidation in a basic medium and cyclization in an acid medium.

The quinacridones of formula (I), in which X is hydrogen and Y is carboxylic ester, may be prepared by condensing 2,5-dicarbomethoxy (or dicarbethoxy) cyclohexane 1,4-diketone with an amine of formula (II), followed by cyclization by heating to a high temperature (200°–260° C) in an inert solvent, and then oxidation in a neutral or acid medium.

Quinacridone compounds of formula (I) wherein X is hydroxy may be prepared by condensing 2,5-dibromo 3,6dicarbomethoxy (or dicarbethoxy) 1,4,-benzoquinone with an amine of formula (II), followed by cyclization by heating to a high temperature (200°–260° C) in an inert solvent, and then reduction at 60° C by means of copper in sulphuric acid.

The quinacridone of this invention having the structure represented by formula (I) may be used for the bulk dyeing of synthetics such as polyesters and polyamides, whether in mass, fiber or filament form. Quinacridone compounds in accordance with the invention have excellent thermal stability. Due to their good solubility in the molten polymers, the compounds of the invention may be used to produce very fine dyed synthetic fibers with very intense colors. The present invention thus enables one to avoid the problems currently met with in the spinning of filaments when using pigments. These problems most often take the form of blocking of the filters which protect the very fine orifices of the spinning nozzles, or of frequent breakages of the filaments, especially during the drawing operations.

Quinacridone compounds in accordance with the invention are also very suitable for synthesizing structurally dyed copolyesters. The term "structurally dyed" is used herein and with reference to these copolyesters is intended to mean copolyesters characterized by the facts that their macromolecular chains contain dyestuff moieties represented by the formula:

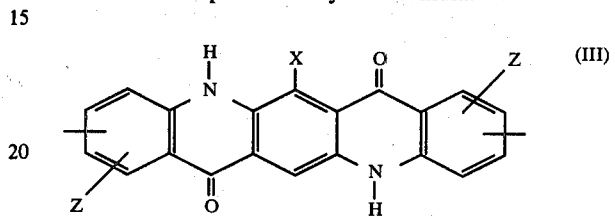

in which X and Z are such as defined above.

These dyed copolyesters can be prepared by copolymerizing one or more quinacridones of the formula (I) with the well known chemical base constituents used to form polyesters and which are known in the art.

For example, polyethyleneglycol terephthalate is commonly produced by a transesterification reaction between dimethyl terephthalate and ethylene glycol by heating in the presence of a catalyst to form the corresponding bis-(β-hydroxyethyl) compound which then polycondenses at high temperature and reduced pressure. In order to obtain dyed polyesters using the compounds of formula I, it is possible to effect the transesterification on the ester functions or the esterification of the alcohol functions of the quinacridones of the formula (I) before completing the synthesis of the polyesters. The quantity of quinacridone of formula (I) to be utilized may vary within wide limits according to the desired coloring intensity as will be apparent to those skilled in the art.

The dyed copolyesters produced in this way will generally have, along with the non-modified polyesters, a remarkable mutual solubility. These dyed copolyesters and particularly those having a high concentration of quinacridone compounds are therefore quite suitable for the bulk dyeing of polyesters, and also for the bulk dyeing of other polymers especially polyamides, polyurethanes, polyolefins. The dyeing of these polymers may be carried out in bulk or in filament or fiber form.

The dyed copolyesters, and particularly those having relatively low concentrations of quinacridone, may be directly transformed into the functional textile fibers, by methods known in the textile industry. Fibers produced in this way possess all of the desirable qualities of the fibers of classic polyesters; e.g., mechanical, plasticity, and the like.

The dyed shades obtained as described herein are vivid, transparent and very resistant to the usual tests, especially light, washing, migration or bleeding and abrasion.

The following examples illustrate the invention. All parts given are by weight unless indicated otherwise.

EXAMPLE 1

Into a flask with a capacity of 2000 parts by volume there are placed 1000 parts by volume of ethanol, 25.6 parts of 2,5-dicarbethoxy cyclohexane-1,4-diketone, 38.7 parts of 4-hydroxymethoxy aniline, and 5 parts by volume of 12N hydrochloric acid. The mixture is heated to 70°–78° C in a nitrogen atmosphere for 3 hours. Yellow needles slowly crystallize. They are filtered at 40°–45° C and washed in ethanol.

The product obtained in this way is dissolved in 500 parts by volume of ethanol, to which is added a solution of 30 parts of sodium hydroxide in 250 parts of water, and then 50 parts of m-nitrobenzene sodium sulphonate. The mixture is then heated with reflux for 4 hours and then poured into 1000 parts of cold water. The solution thereupon clarifies. It is then acidified to a pH of 2 by adding hydrochloric acid, and a violet precipitate which is formed is filtered off, washed with water until neutral and then dried.

10 parts of the bis-2,5(4-hydroxymethoxyphenylamino) benzene 1,4-dicarboxylic acid obtained in this way is dissolved in 100 parts of polyphosphoric acid at 70° C, then heated to 100°–120° C for 2 hours, and allowed to cool to 90° C. The polyphosphoric acid is then hydrolized by adding 200 parts of water, a little at a time. The precipitate that is formed is then filtered off, washed in water until nuetral and then in acetone, and is dried for 5 hours at 110° C.

The bis-2,9 (hydroxymethoxy) quinacridone obtained in this way dyes polyesters a violet-red shade.

EXAMPLE 2

The following mixture is heated at 95°–100° C for 6 hours in a nitrogen atmosphere: —25.6 parts of 2,5-dicarbethoxy cyclohexane 1,4-diketone, 49.5 parts of ethyl p.amino-benzoate, 0.5 parts of p.toluene-sulphonic acid, and 50 parts by volume of Dowtherm A (a eutetic mixture of 23.5% diphenyl and 76.5% diphenyl oxide). The mixture is cooled to 85° C and to it are added 100 parts by volume of methanol. The precipitate obtained is then filtered off and washed with methanol. The pale yellow powder is obtained which melts at 165° C and which is immediately cyclized to 6,13-dihydro 2,9-dicarbethoxy quinacridone by heating to 255°–256° C in 50 parts by volume of Dowtherm A in a nitrogen atmosphere. Pale yellow needles form.

A suspension of 7.5 parts of 2,9-dicarbethoxy 6,13-dihydro quinacridone and 9 parts of chloranile (2,3,5,6,-tetrachloro 1,4-benzoquinone) in 350 parts by volume of ethoxy-ethanol are heated for 6 hours with reflux. The mixture is filtered at 90°–100° C and the produce obtained is taken up in hot ethoxy-ethanol, filtered again, and washed with dimethylformamide and ethanol. After drying at 110° C, 2,9-dicarbethoxy quinacridone is obtained, which dyes polyesters a bright pink shade.

EXAMPLE 3

In a container fitted with a reflux column and an efficient agitator and containing 200 parts by volume of dry methanol there are dissolved 8.2 parts of 2,5-dibromo 3,6-dicarbethoxy 1,4-benzoquinone and 8.3 parts of ethyl p-aminobenzoate. The mixture is brought to reflux point and about 2 parts of pyridine added, reflux then being maintained for 90 minutes. The mixture is filtered while hot and the precipitate that is formed is washed with methanol. The bis-2,5(4-carbethoxy phenylamino)3,6-dicarbethoxy 1,4-benzoquinone obtained in this way is then cyclized to quinacridone-quinone by heating to 255°–256° C for 2 hours in 200 parts by volume of Dowtherm A.

1 part of the quinacridone-quinone obtained in this way is dissolved at 60° C in 10 parts of 96% sulphuric acid. 1.5 parts of powdered copper are then added and admixing continued for 2 hours while maintaining the temperature at 60° C. The excess copper is removed by filtration and water added to the filtrate a little at a time until crystallization occurs, the blue paste obtained then being filtered off. The product is taken up in dilute sulphuric acid. The precipitate turns mauve; it is filtered off and washed with water until neutral, then in ethanol. It is dried at 110° C.

The 2,9-dicarbethoxy 6-hydroxy quinacridone obtained in this way dyes polyesters a violet-red shade.

EXAMPLES 4 to 7

The same process is carried out as in Example 3, except that the ethyl p.aminobenzoate is replaced with ethyl o.aminobenzoate, ethyl 2-amino 5-chloro benzoate, ethyl 3-amino 4-methyl benzoate, or ethyl 3-amino 4-methoxy benzoate, respectively.

There are respectively obtained:

4,11-dicarbethoxy 6-hydroxy quinacridone,
4,11-dicarbethoxy 2,9-dichloro 6-hydroxy quinacridone,
1,8-dicarbethoxy 4,11-dimethyl 6hydroxy quinacridone, and
1,8-dicarbethoxy 4,11dimethoxy 6-hydroxy quinacridone.

These quinacridones dye polyesters shades varying from claret to violet.

EXAMPLE 8

Into a container rotating about its axis, there is introduced 100 parts of polyethyleneglycolterephthalate and 0.5 parts of 4,11-dicarbethoxy 6-hydroxy quinacridone as described in Example 4; these ingredients are mixed together for 1 hour. The mixture is then introduced into a screw extruder, the spinneret of which is heated to 275° C. At the outlet from the extruder the mixture is cooled and then turned into grains about 2 mm across. The grains are dried and then introduced into a spinning device in which the molten mixture is subjected to a constant pressure on a melting grid at 280° C before passing over a filter bed based on washed and roasted river sand, the grains of which are about 0.03 mm across, and then through a spinning nozzle having 7 orifices 0.23 mm in diameter. The filaments obtained are then drawn with a drawing coefficient of 5, and heat treated at 150° C for 40 minutes.

The dyed polyester filaments obtained in this way are of a violet-red shade which is very fast, especially to heat. If the dyed polyester is held in the molten state in a nitrogen atmosphere for 5 hours there is no noticeable deterioration in the shade.

EXAMPLE 9

A mixture of 100 parts of dimethylterephthalate, 100 parts of ethyleneglycol, 5 parts of methanol and 0.04 parts of cadmium acetate are heated under a stream of nitrogen. Simultaneously and in proportion to its formation, the methanol separated by the transesterification reaction is distilled off. The theoretical quantity of 46 parts is obtained at the end of 1 hour; at this point, the reaction temperature rises to 220° C. Then, 0.02 parts of tetrabutyltitanate Ti(OC4H9)4 and 0.5 parts of bis-2,9(hydroxymethoxy) quinacridone, the preparation of which is described in Example 1 are added. Thereafter, the mixture is heated for 30 minutes at 230°-240° C by way of a molten metal bath, under slight vacuum, so as to eliminate the excessive formation of ethyleneglycol. The pressure is then lowered over a period of 30 minutes until 16 mm of mercury is reached and the temperature is raised to 275° C. Then, the pressure is again lowered to 0.05 mm mercury and polycondensation is effected over a period of 90 minutes.

There is obtained by this procedure a violet-red copolyester; the intrinsic viscosity of which measured at 25° C in o-chlorophenol, is ob 0.53 100 cm$^3$g$^{-1}$ and which melts at 255° C (M.P. determined by thermal differential analysis).

The following table represents the characteristics of other copolyesters obtained according to the procedures of Example 9, but by replacing the bis-2,9(hydroxymethoxy) quinacridone with the same quantity of the quinacridone of formula (I), as defined in the first column of the table. The intrinsic viscosity (expressed in 100 cm$^3$g$^{-1}$) was measured at 25° C in o-chlorophenol.

| Quinacridone | Color of copolyester | Viscosity | M.P. in ° C |
|---|---|---|---|
| 2,9-dicarbethoxy quinacridone | pink | 0.65 | 258 |
| 6-hydroxy 4,11-dicarbethoxy quinacridone | violet-blue | 0.52 | 250 |
| 6-hydroxy 2,9-dichloro 4,11-dicarbethoxy quinacridone | violet | 0.49 | 248 |

Other modifications of the present invention will be apparent to those skilled in the art.

I claim:

1. A quinacridone of the formula:

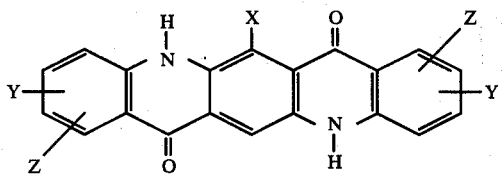

in which
X is hydrogen of hydroxy;
Y is hydroxyalkoxy containing 1 to 4 carbon atoms or carboyxlic ester COOR;
R is alkyl containing 1 to 4 carbon atoms; and
Z is hydrogen, halogen, alkyl containing 1 to 4 carbon atoms or alkoxy containing 1 to 4 carbon atoms, with the proviso that both X and Z are hydrogen when Y is hydroxyalkoxy.

2. A quinacridone compound as defined in claim 1 wherein Y is hydroxyalkoxy containing 1 or 2 carbon atoms.

3. A quinacridone compound as defined in claim 1 wherein Z is chlorine.

4. A quinacridone compound as defined in claim 1 wherein Z is bromine.

5. A quinacridone compound as defined in claim 1 wherein Z is alkyl containing 1 or 2 carbon atoms.

6. A quinacridone compound as defined in claim 1 wherein Z is alkoxy containing 1 or 2 carbon atoms.

7. A quinacridone of the formula:

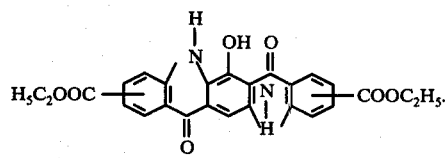

8. A quinacridone of the formula:

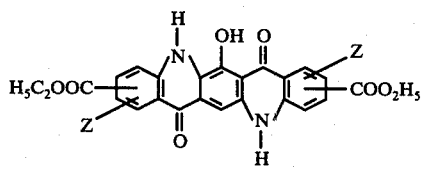

in which Z is halogen.

9. A quinacridone of the formula:

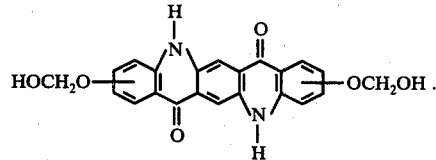

10. A quinacridone of the formula:

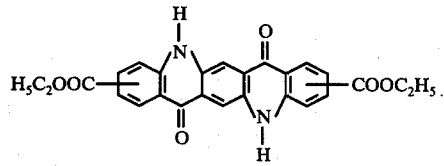

11. A quinacridone of the formula:

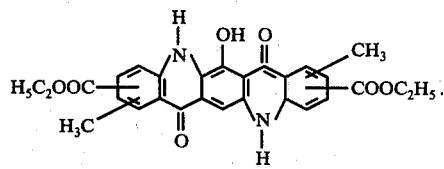

12. A process for the dyeing of polyester filaments and fibers comprising forming a mixture of a polyester and a compound of claim 1 and forming fibers from the mixture.

13. A polyester fiber dyed with a quinacridone according to claim 1.

* * * * *